United States Patent
Ramchandran et al.

(10) Patent No.: US 8,446,253 B2
(45) Date of Patent: May 21, 2013

(54) LOCALIZATION USING VIRTUAL ANTENNA ARRAYS IN MODULATED BACKSCATTER RFID SYSTEMS

(75) Inventors: Kannan Ramchandran, El Cerrito, CA (US); Ben J. Wild, San Francisco, CA (US); Artem Tkachenco, Fremont, CA (US); Upamanyu Madhow, Santa Barbara, CA (US)

(73) Assignee: Checkpoint Systems, Inc., Thorofare, NJ (US)

( * ) Notice: Subject to any disclaimer, the term of this patent is extended or adjusted under 35 U.S.C. 154(b) by 340 days.

(21) Appl. No.: 12/719,126

(22) Filed: Mar. 8, 2010

(65) Prior Publication Data

US 2010/0309017 A1  Dec. 9, 2010

Related U.S. Application Data

(60) Provisional application No. 61/159,305, filed on Mar. 11, 2009.

(51) Int. Cl.
*G08B 5/22* (2006.01)

(52) U.S. Cl.
USPC .......................................... 340/8.1; 340/572.1

(58) Field of Classification Search
USPC ............ 340/572.5, 572.1, 10.5, 825.49, 10.1, 340/8.1, 10.11
See application file for complete search history.

(56) References Cited

U.S. PATENT DOCUMENTS

| | | | |
|---|---|---|---|
| 5,604,485 A * | 2/1997 | Lauro et al. | 340/572.5 |
| 5,640,170 A | 6/1997 | Anderson | |
| 6,380,894 B1 | 4/2002 | Boyd et al. | |
| 6,400,139 B1 | 6/2002 | Khalfin et al. | |
| 6,549,004 B1 | 4/2003 | Prigge | |
| 6,754,609 B2 | 6/2004 | Lescourret | |
| 6,831,603 B2 | 12/2004 | Menache | |
| 7,009,561 B2 | 3/2006 | Menache et al. | |
| 7,117,581 B2 | 10/2006 | Arneson et al. | |
| 7,274,166 B2 | 9/2007 | Kim | |
| 7,652,577 B1 * | 1/2010 | Madhow et al. | 340/572.1 |
| 2002/0145563 A1 | 10/2002 | Kane et al. | |
| 2003/0002033 A1 | 1/2003 | Boman | |
| 2004/0020036 A1 | 2/2004 | Arneson et al. | |
| 2004/0178955 A1 | 9/2004 | Menache et al. | |
| 2005/0172215 A1 | 8/2005 | Squibbs et al. | |
| 2007/0005367 A1 | 1/2007 | DeJean et al. | |
| 2007/0159400 A1 | 7/2007 | DeJean et al. | |
| 2008/0143482 A1 * | 6/2008 | Shoarinejad et al. | 340/10.1 |
| 2009/0212921 A1 * | 8/2009 | Wild et al. | 340/10.5 |
| 2010/0109903 A1 * | 5/2010 | Carrick | 340/825.49 |

* cited by examiner

*Primary Examiner* — Hai Phan
*Assistant Examiner* — Kaleria Knox
(74) *Attorney, Agent, or Firm* — Caesar, Rivise, Bernstein, Cohen & Pokotilow, Ltd.

(57) ABSTRACT

A localization method for use in a tag communication system includes associating a supertag having a plurality of tags with an item, reading backscatter signals from the tags of the plurality of tags to provide a plurality of backscatter signals, estimating a signal parameter of the backscatter signals of the plurality of backscatter signals to provide a plurality of derived signal parameters, and localizing the item in accordance with the plurality of derived signal parameters. The backscatter signals are read by a tag reader having a single antenna and the item is localized in accordance with an antenna array technique performed upon the plurality of derived signal parameters. The backscatter signals are read with an antenna array to provide a further plurality of derived signal parameters for each tag of the plurality of tags, and the item is localized in accordance with the further pluralities of derived signal parameters.

8 Claims, 2 Drawing Sheets

LOCALIZATION USING VIRTUAL ANTENNA ARRAYS IN MODULATED BACKSCATTER RFID SYSTEMS

BACKGROUND OF THE INVENTION

1. Field of Invention

This invention relates to security tags and, more particularly, to localizing security tags and security tag readers.

2. Description of Related Art

U.S. Patent Publication No. 2002/0145563 A1, filed on Jan. 26, 2001 by Kane, discloses the use of time of arrival information and phase difference information in backscatter signals for precisely localizing a subject, and precisely monitoring the gait of the subject. In the Kane system the backscatter signals are produced by a plurality of RFID tags positioned at different locations on the body of the subject to be monitored. Additionally, Kane teaches a plurality of receiving antennas for receiving the signals from the tags on the body of the subject, and performing separate phase difference calculations.

U.S. Pat. No. 7,009,561, issued on Mar. 7, 2006 to Menache, discloses an RF motion tracking system including a stationary RF transmitter and a plurality of stationary RF receivers defining sensors placed at known location to define a capture zone. A plurality of RF tags is placed on an object being tracked to serve as marker tags. The marker tags backscatter the signal from the stationary RF transmitter. The sensors determine the relative phases between the signal received from the stationary RF transmitter and the signals received from the marker tags. The relative phase information determined at the sensors is processed to determine the respective positions of the marker tags. However, in Menache the marker tags are distributed over a number of items, and are thus not disposed on a single tag device. Furthermore, the marker tags in the Menache system do not maintain a known geometric relationship with respect to each other.

U.S. Patent Publication No. 2005/0172215 A1, filed on Jan. 14, 2005 by Squibbs, teaches that multiple tags can be embedded in an object in a system for determining the location of the object. The object can be, for example, a sheet of paper. At least one of the tags stores location data concerning a relationship between the object and one or more of the embedded tags. The tags taught by Squibbs contain location data which permit a determination where the object belongs when the data is scanned and displayed. The relative positions of the embedded tags are not used to determine where the object is located.

Several references disclose localizing items using a plurality of receivers. In these systems information such as phase differences, differences in round trip travel times and differences in field strength are determined because the different receivers receive signals from the items at different distances and/or directions.

For example, U.S. Pat. No. 6,380,894, issued on Apr. 30, 2002 to Boyd, discloses an asset management radio location system that uses time of arrival differentiation from a plurality of distributed tag transmission readers to locate a tag fixed to an item within a monitored environment. An object location processor is coupled to the distributed readers over signal transport paths having different transport delays, and carries out the time of arrival differentiation of the transmissions from a tag to determine where its object is located. U.S. Pat. No. 6,400,139, issued on Jun. 4, 2002 to Khalfin, teaches placing one or more probe sensors on an object to be tracked within a volume, and placing a plurality of witness sensors within the volume. The output of the witness sensors is used to compute the position and orientation of the probe sensors. U.S. Patent Publication No. 2003/0002033 A1, filed on Jun. 27, 2001 by Boman, discloses three sensor sets for detecting the location of a radiation source. Each sensor set in Boman can contain a pair of sensors for detecting the location of two different radiation sources simultaneously. U.S. Pat. No. 6,549,004, issued on Apr. 15, 2003 to Prigge, discloses a system wherein a plurality of beacons located at known positions generates coded magnetic fields, and a magnetic sensor measures a sum field. The sum field is decomposed into component fields to determine the sensor position and orientation. These references teach a single source being localized by a plurality of receivers.

Additionally, U.S. Pat. No. 6,754,609, issued on Jun. 22, 2004 to Lescourret, discloses a device for measuring the position and orientation of a mobile object with respect to a fixed structure. In the Lescourret system a first assembly of coils emitting magnetic fields is secured to the fixed structure, and a second assembly of coils for receiving magnetic fields is secured to the object, forming a sensor. The position and orientation of the mobile object is determined according to the sensor readings of the emitted fields. What is needed is a system and method for more accurately localizing tags and tag readers without the use of physical antenna arrays.

All references cited herein are incorporated herein by reference in their entireties.

BRIEF SUMMARY OF THE INVENTION

A localization method for use in a tag communication system includes associating a supertag having a plurality of tags with an item, reading backscatter signals from the tags of the plurality of tags to provide a plurality of backscatter signals, estimating a signal parameter of the backscatter signals of the plurality of backscatter signals to provide a plurality of derived signal parameters, and localizing the item in accordance with the plurality of derived signal parameters. The backscatter signals are read by a tag reader having a single antenna and the item is localized in accordance with an antenna array technique performed upon the plurality of derived signal parameters. The backscatter signals are read with an antenna array to provide a further plurality of derived signal parameters for each tag of the plurality of tags, and the item is localized in accordance with the further pluralities of derived signal parameters. The plurality of derived signal parameters are calibrated in accordance with the further pluralities of derived signal parameters.

The step of reading backscatter signals from the tags of the plurality of tags is performed at a plurality of different positions to provide a further plurality of derived signal parameters for each tag of the plurality of tags, and the item is localized in accordance with the further pluralities of signals. The signal parameter is phase information or time information. The tags of the plurality of tags are disposed on the supertag with a known geometric relationship with each other. Tags of the plurality of tags are disposed on the supertag in a linear array, a two dimensional array, or a three dimensional array. A tag reader location is determined in accordance with the plurality of derived signal parameters. Identity information is assigned to at least one tag of the plurality of tags, and the identity information of the at least one tag is determined in accordance with a backscatter signal from the at least one tag. Communicating with the at least one tag in accordance with the determined identification information is performed.

A localization method for use in a tag communication system, includes associating a tag with an item, and reading a backscatter signal from the tag at a plurality of tag reader locations to provide a plurality of backscatter signals. A signal parameter of the backscatter signals of the plurality of backscatter signals is estimated to provide a plurality of derived signal parameters, and the item is localized in accordance with the plurality of derived signal parameters. The backscatter signals are read by a tag reader having a single antenna, and the item is localized in accordance with an antenna array technique performed upon the plurality of derived signal parameters. The backscatter signals are read with an antenna array to provide a further plurality of derived signal parameters for each tag reader location of the plurality of tag reader locations, and the item is localized in accordance with the further pluralities of derived signal parameters. The plurality of derived signal parameters is calibrated in accordance with the further pluralities of derived signal parameters. A supertag having a plurality of tags is associated with the item, and backscatter signals from the tags of the plurality of tags are read to provide a further plurality of backscatter signals. A signal parameter of the backscatter signals of the further plurality of backscatter signals is estimated to provide a further plurality of derived signal parameters, and the item is localized in accordance with the further plurality of derived signal parameters. The tag is a marker tag and a tag reader location is determined in accordance with the plurality of signal parameters.

In an RFID system, tags communicate with a reader using modulated backscatter. The backscattered signal from the tag can be processed by the reader to derive estimates of the tag location relative to the location of the reader. A reader equipped with an antenna array can significantly enhance its localization capability, by estimating quantities such as the angle of arrival of the backscattered signal from the tag. Systems and methods for localization using modulated backscatter signal are disclosed in U.S. patent application Ser. No. 12/072,423 entitled "Localizing tagged assets using modulated backscatter," filed Feb. 25, 2008, whose entire disclosure is incorporated by reference herein. The method and system of the present invention provides the benefits of having multiple reader antennas, without actually requiring that the reader be equipped with multiple antennas.

A plurality of RFID tags is disposed in an array on a single RFID tag device, for providing backscatter signals with different round trip travel times and different phases for reception by an RFID reader. The tags of the plurality of tags are disposed in a known fixed relative geometric relationship with respect to each other. For example, the individual tags can be arranged in a linear one dimensional array, in a two dimensional array such as a rectangular array, an L-shaped array, or a circular array, or in a three dimensional array.

When the tags are arranged on a tag in an array, a reader with a single element antenna can achieve localization accuracy similar to that achieved by a reader equipped with an antenna array of the same geometry and size as the tags in the array. The tags arranged in this manner can thus form a virtual antenna array tag, or a virtual array tag. A tag having a plurality of tags disposed upon it in this manner can be called a supertag. Virtual array tags can be used to enhance asset tracking. Furthermore, such virtual array tags disposed at known locations can also be used by a reader to localize itself.

The additional information provided by the different round trip travel times and the different phases of the backscatter signals permits enhanced accuracy in reading the backscatter signals. For example, it can permit enhanced accuracy in localizing the tags, in identifying an item associated with the tag device, and/or in localizing a reader relative to virtual array tags that are positioned at known locations to act as markers. A single element antenna receiving backscatter signals from the virtual array tag can achieve localization accuracy similar to that achieved by a reader equipped with an antenna array of approximately the same geometry and size as the array of tags in the virtual array tag. This can assist in providing low cost infrastructure for supporting navigation or locating items in an area such as a store or a warehouse.

Another embodiment of the invention creates virtual antenna arrays using reader mobility. In this embodiment the complex gain corresponding to the retroreflected signal from a particular tag is measured at several different locations. This permits inducing a geometry analogous to a physical antenna array at the reader, thereby permitting accurate localization of the reader relative to the tag. The preceding methods for synthesizing virtual arrays, namely the use of multiple tags with known relative geometry and reader mobility, can be combined with each other to further enhance localization capability.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
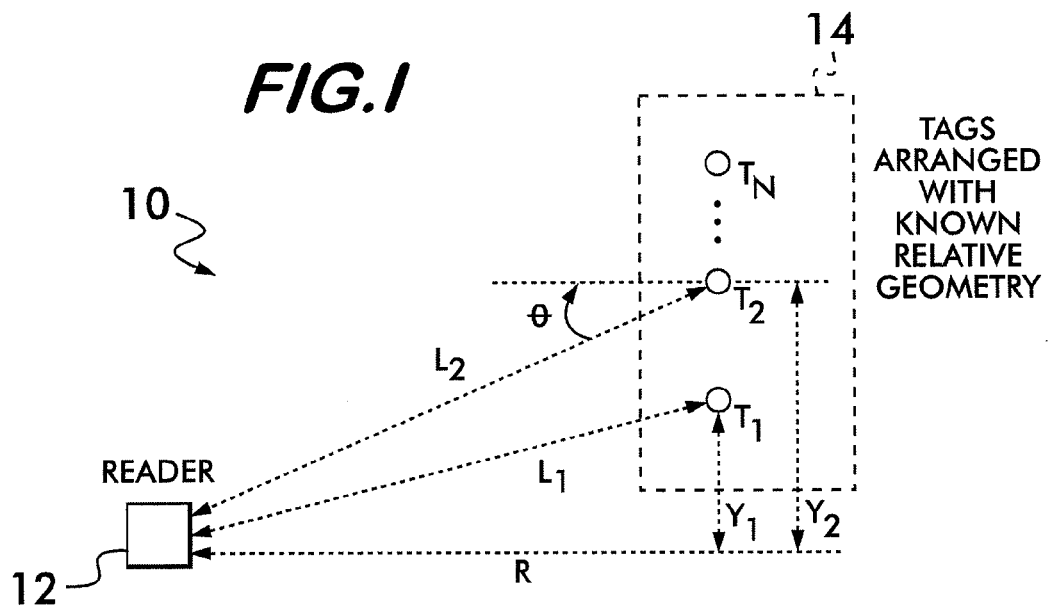
FIG. 1 shows a schematic representation of an embodiment of the virtual antenna array system of the present invention.

Referring now to FIG. 1, there is shown a schematic representation of the virtual antenna array system 10. The virtual antenna array system 10 includes a tag reader 12 and a virtual array tag 14. A plurality of tags $T_1$-$T_N$ are disposed on the virtual array tag 14 in a manner know those skilled in the art, wherein the virtual array tag 14 can comprise any type of carrier device upon which the tags $T_1$-$T_N$ may be disposed. The tags $T_1$-$T_N$ are preferably single antenna tags. Although the individual tags $T_1$-$T_N$ are shown arranged in a linear array, it will be understood that they can be disposed in any known geometric relationship with respect to each other. For example, the tags $T_1$-$T_N$ can be fixed in a rectangular array, in an L-shape array, in a circular array, or in any other known geometries including other two dimensional geometries and three dimensional geometries.

The tag reader 12 can read two or more tags $T_1$-$T_N$ within the virtual array tag 14. In the case where the tag reader 12 reads the tags $T_1$ and $T_2$, as shown in FIG. 1, the tag reader 12 can compute the difference in phase of the carrier signal received back from the tags $T_1$ and $T_2$ and the phase of the transmitted carrier signal. These calculations can be performed in addition to demodulating the data sent back by the tags $T_1$ and $T_2$. The phase difference depends on the round trip travel times between the tag reader 12 and the tags $T_1$ and $T_2$. For example, if $\phi_1$ denotes the phase difference for tag $T_1$, and $\phi_2$ denotes the corresponding phase difference for tag $T_2$, then $\phi_2 - \phi_1$ is determined by the difference in the round trip path lengths between the tag reader 12 and the tags $T_1$ and $T_2$. Therefore, ignoring noise and other impairments, the phase difference $\phi_2 - \phi_1 = 4\pi(L_2 - L_1)/\lambda$, where $\lambda$ denotes the carrier signal wavelength.

This is twice the phase difference that would have resulted if the role of tag reader 12 and the tags $T_1$ and $T_2$ was switched; that is, if the tag reader 12 had an antenna array and the tag 14 was a single tag rather than an antenna array tag. Thus, the geometry of the array of tags $T_1$-$T_N$ with a single reader antenna is analogous to, but not identical to, the geometry of a reader with an antenna array and a single tag. Accordingly, the conventional mathematical antenna array techniques for determining the location of a single tag with an antenna array at the tag reader can be used to determine the location of the virtual array tag 14 using the tag reader 12 with a single antenna.

Tag reader systems using such supertags may therefore be viewed as having a virtual antenna array, even though the tag reader may only have a single antenna. The localization provided by such a virtual antenna array can be substantially as enhanced as the localization provided by a tag reader with an antenna array. Moreover, localization can be further improved by using readers with a physical antenna array as well as tags $T_1$-$T_N$, in a manner evident to one skilled in the art. Furthermore, the use of a multiple antenna array at the tag reader can be useful for calibration, for example for calibrating out any imperfections in the measured phase responses of the tags $T_1$-$T_N$ due to discrepancies in individual tag responses, such as antenna reflection coefficients, as would be evident to one skilled in the art.

In the virtual antenna array system 10, the lengths between the tag reader 12 and the tags $T_1$ and $T_2$ are given by:

$$L_1 = \sqrt{R^2 + y_1^2}, L_2 = \sqrt{R^2 + y_2^2}.$$

Therefore, if $y_2 = y_1 + d$, with d known, then:

$$L_2 - L_1 = \sqrt{R^2 + y_2^2} - \sqrt{R^2 + y_1^2} \approx \frac{y_1 d + d^2}{\sqrt{R^2 15 + y_1^2}}$$

so that the phase difference corresponding to the path length difference provides information about $y_1$ and R. In the far field limit, $L_2-L_1=d \sin \theta$, so that $\phi_2-\phi_1=4\pi d \sin \theta/\lambda$, which is the usual equation for the phase difference between elements in a linear array, except for a doubling of the phase difference due to the round trip propagation from the tag reader 12 to the tags $T_1$-$T_N$. For a physical N element linear array, the array response corresponding to a direction of arrival or departure $\theta$ relative to the broadside is given by $a(\theta)=(1, \alpha, \alpha^2, \ldots, \alpha^{N-1})^T$, where $$\alpha = \exp(j2\pi d \sin \theta / \lambda).$$

For a virtual array formed by N tags arranged in a linear array within the virtual array tag 14, the vector of readings at the tag reader 12 from the N tags $T_1$-$T_N$ is termed the virtual array response, and is given by $v(\theta)=a(\theta)\cdot{}^*a(\theta)=(1, \alpha^2, \alpha^4, \ldots, \alpha^{2(N-1)})^T$, where x$\cdot$*y denotes the element wise product of two vectors x and y. This structure arises due to the round trip propagation from the tag reader 12 to the tags $T_1$-$T_N$. Therefore, the virtual array response readings can be used to estimate the angle of arrival $\theta$ from the tag reader 12 to the virtual array tag 14 in a manner analogous to estimation using physical arrays. In general, by arranging the tags $T_1$-$T_N$ within the virtual array tag 14 in various geometries, it is possible to obtain localization information in a manner analogous to that obtained using physical antenna arrays with similar geometries (e.g., two angles can be estimated using a two dimensional array). The range from the tag reader 12 to the virtual array tag 14 can be estimated using a variety of antenna array techniques known to those skilled in the art, including received signal strength or FMCW modulation. This enables determination of the three dimensional relative location of the tag reader 12 and the virtual array tag 14.

Figure 2:
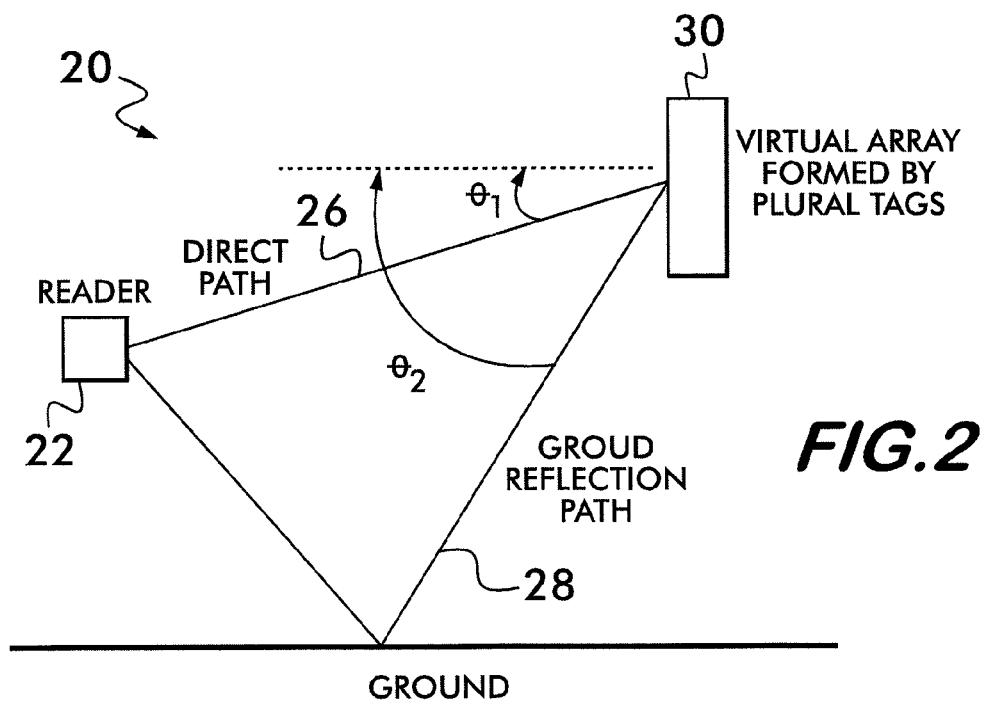
FIG. 2 shows a schematic representation of an embodiment of the virtual antenna array system of the present invention.

Referring now to FIG. 2, there is shown a virtual antenna array system 20. The virtual antenna array system 20 includes a tag reader 22 that is in communication with a virtual array tag 30. The tag reader 22 can be a single antenna tag reader. There are two paths from the tag reader 22 to the virtual array tag 30, and from the virtual array tag 30 back to the tag reader 22: the direct path 26 and the ground reflection path 28. Therefore, the mathematical model for a virtual array due to round trip propagation between the tag reader 22 and the virtual array tag 30 is given by $$v = (\gamma_1 a(\theta_1) + \gamma_2 a(\theta_2)) \cdot {}^*(\gamma_1 a(\theta_1) + \gamma_2 a(\theta_2))$$

where $\gamma_1$ and $\gamma_2$ are complex gains. Those skilled in the art will understand that this mathematical model is a well known modification of the mathematical model for a physical antenna array.

Based on readings obtained by the tag reader 22, therefore, it is possible to estimate the parameters $\theta_1, \theta_2, \gamma_1, \gamma_2$, or a subset thereof, as long as there are enough tags $T_1$-$T_N$ in the virtual array tag 30 (i.e., as long as the dimension of the virtual array of the virtual array tag 30 is large enough). Any of a multitude of approaches for estimating these parameters, as would be evident to one skilled in the art, can be used. For example, maximum likelihood methods, Bayesian methods (which can incorporate any prior information that is available about the location of the tag reader 22 and/or the virtual array tag 30, and the multipath environment), and subspace based methods used in sinusoidal retrieval and spectral estimation applications can be used.

While the virtual antenna array system 20 illustrates a specific multipath environment, the modeling and estimation approach disclosed herein generalizes to more complex environments in a manner evident to one skilled in the art. Included in such generalizations is the use of standard subspace based techniques such as MUSIC or ESPRIT, based on the second order statistics of a virtual array response. Such statistics can be obtained by averaging readings obtained over multiple times and/or carrier frequencies. It is also possible to directly use these subspace based methods such as ESPRIT and MUSIC on the baseband measurement data at the reader without the need for generating second order statistics such as covariance statistics. Such methods are well known to one who is skilled in the art.

The virtual array tag concepts are disclosed herein using one dimensional virtual arrays for the sake of simplifying the description. However, the concepts are directly applicable to two dimensional and three dimensional virtual arrays, as is evident to one skilled in the art. Those skilled the art will understand that the localization calculations performed according to the invention can be performed upon angle of arrival parameters, round trip travel time parameters, or any other signal parameters that can be determined by or provided to the tag reader 12.

Figure 3:
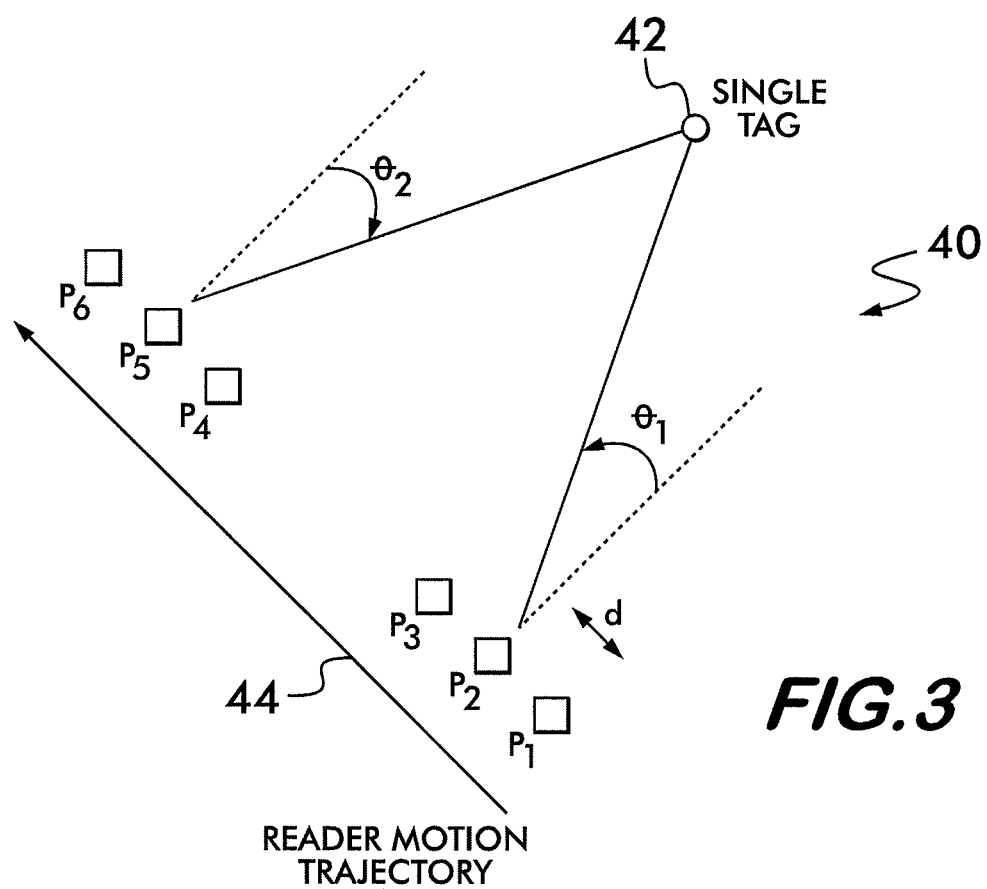
FIG. 3 shows a schematic representation of an alternate embodiment of the virtual antenna array system of the present invention.

Referring now to FIG. 3, there is shown the single tag virtual antenna array system 40. The single tag virtual antenna array system 40 includes a single tag 42 and a single mobile tag reader. The single tag 42 can be understood to include a single antenna rather that an array of antennas. Using the mobile tag reader, a virtual antenna array geometry analogous to the geometry of the virtual array tags 14, 30, can be induced with the single tag 42. This can be accomplished by taking snapshots of the tag 42 at multiple tag reader locations. The phase of the return signals from the tag 42 can be estimated for each snapshot. The use of snapshots in this manner can create a virtual array whose geometry depends on the motion trajectory of the mobile tag reader. By appropriately spacing out the tag reader locations at which the snapshots are taken, it is possible to create a geometry corresponding to the virtual array tags 14, 30, or any other array of tags.

In the example shown in the virtual antenna array system 40, a virtual linear array with equidistant antenna elements can be synthesized by the linear motion of the single mobile tag reader. When the tag reader moves at a constant velocity along the motion trajectory 44, snapshots equally spaced in time can be taken. This corresponds to reader positions $P_1$, $P_2$ and $P_3$ when three snapshots are taken. This process creates a geometry analogous to a standard linear array with three equally spaced elements, for example the geometry of the virtual array tag 14 of the virtual antenna array system 10 when N=3. Subsequently, after letting a larger interval of time elapse, more equally spaced snapshots can be taken, for example when the reader is at positions $P_4$, $P_5$ and $P_6$. This creates another virtual linear array with three equally spaced elements.

If an estimate of the reader velocity is available, then the spacing between the elements of the virtual arrays, and hence the virtual array response corresponding to a given angle of arrival, can be estimated. The angles of arrival $\theta_1$ and $\theta_2$ relative to the broadside of the two virtual arrays created by the two sets of snapshots can therefore be estimated based on the virtual array responses, substantially as described above for the virtual array tags 14, 30. The location of the single tag 42 relative to the mobile reader can then be estimated using simple geometric calculations. More generally, if $\phi(t)$ is the phase of the return signal from the single tag 42 at time t, then, based on noisy samples of $\phi(t_i)$, i=1, 2, 3, . . . , where $\{t_i\}$ are the times at which the snapshots are taken, both the location of the single tag 42 and the motion trajectory 44 of the mobile reader can be estimated using maximum likelihood techniques, Bayesian estimation techniques, or any other antenna array techniques.

A simplifying assumption that is useful in the virtual antenna array system 40 is that the motion trajectory 44 of the reader is piecewise linear, so that the velocity vector for each line segment can be estimated using a sufficient number of snapshots of the phase response from the single tag 42. The times at which the snapshots are taken may be optimized in order to create appropriate geometries for the virtual arrays induced by the reader motion, including the use of standard techniques for optimizing the location of antenna elements in nonuniform physical antenna arrays.

The estimates of the reader velocity obtained as above can be used to control the motion of the reader in applications such as robotics, in which robots are equipped with RFID readers. Marker tags in known locations can be used to estimate the absolute location of the reader within an area of interest, and for feedback control of the motion and actions of a robot equipped with the RFID reader. Methods of utilizing reader motion as described herein may be supplemented by the systems and methods disclosed in "Localizing tagged assets using modulated backscatter," referred to above. This includes the use of reader mobility for improved localization performance.

The phase response for an individual snapshot of the single tag 42 can be estimated by comparing the phase of the carrier transmitted by the mobile reader to the phase of the return signal from the single tag 42. If the tag 42 uses amplitude shift keying, the data transmitted by the tag 42 does not change the phase of the carrier that it is electronically reflecting. If the tag 42 uses phase shift keying, then the phase estimation can be carried out in a decision directed fashion, after removing the effect of the data modulation on the phase.

Medium Access Control (MAC) for virtual antenna arrays can be optimized using the system and method of the invention. For example, the N tags within the virtual array tag 14 can be assigned identities. Furthermore, the identities can have a known prior relationship. More generally, the contents of memory registers for the N tags within the virtual array tag 14 can be assigned an a priori known relationship with each other. Thus, once the tag reader 12 has read identity information from the backscatter signal of one of the tags $T_1$-$T_N$, it can use the prior knowledge to singulate, and more efficiently communicate with individual tags $T_1$-$T_N$ within the virtual array tag 14 based upon the identity information. This can significantly reduce the contention in medium access. Similarly, when the mobile tag reader within the virtual antenna array system 40 is in motion reading the single tag 42 repeatedly at a number of times, it can optimize medium access by singulation. Additionally, it can use other techniques involving prior knowledge about the identities, or contents of memory registers, for a set of tags that the reader may read one or more times.

The virtual antenna arrays of the invention can be advantageously applied to any tag communication systems, including asset or personnel localization and asset or personnel tracking systems. For example, virtual antenna array tags, such as the virtual array tags 14, 30, can be affixed to assets. This can enable readers with a single element antenna to provide localization accuracy comparable to readers with antenna arrays, including systems and methods such as those disclosed in "Localizing tagged assets using modulated backscatter," referred to above. These systems and methods include the use of virtual antenna array tags, as well as single tags, at known locations as location marker tags. By determining its location relative to the marker tags and/or marker virtual array tags, the reader can estimate its own absolute location, as well as the absolute locations of the assets tagged with single tags or virtual antenna array tags. This can be used, for example, for precise guidance of a forklift with a built in tag reader to desired assets to be transported.

Another area where the virtual antenna arrays of the invention can be advantageously applied in is the monitoring of, for example, the location of automobiles in car dealership parking lots. The virtual antenna arrays can provide improved resolution in the localization and tracking of vehicles in the lot. A single antenna mobile reader fixed to a cart or a vehicle can provide an emulation of a reader having an antenna array, without the need for a large antenna array at the reader, or even a supertag array. This can be done by using the motion of the cart or vehicle carrying the reader to create a virtual antenna array, as described with respect to the single tag virtual antenna array system 40.

The disclosed invention can also be advantageously applied to self localization and navigation. For example, a human equipped with a handheld reader, or a robot equipped with a built in reader, can obtain location information based on backscatter signals from virtual antenna array tags placed at known locations. This can be used, for example, to localize and guide customers in a store, including directing targeted advertisements to the customers based on their locations in the store. It can also be used to navigate a warehouse. This kind of localization can be accomplished with a resolution comparable to that of a tag reader with a large multiantenna array, through the use of a multi element supertag, even for a tag reader with a single antenna (or a small number of antennas). This permits a tag reader with a small form factor to provide performance comparable to that of a much bulkier and larger tag reader.

The localization techniques disclosed herein permit a handheld reader with a single antenna to obtain accurate localization information by synthesizing virtual arrays using supertags and/or reader motion. The information thus obtained can be used to provide feedback to a user carrying the reader, in order to guide the user towards a tagged asset which the user is trying to locate.

While the invention has been described in detail and with reference to specific examples thereof, it will be apparent to one skilled in the art that various changes and modifications can be made therein without departing from the spirit and scope thereof.

What is claimed is:

1. A localization method for use in a tag communication system, comprising:
    associating a tag with an item;
    interrogating said tag by a reader which receives in turn a plurality of backscatter signals equally-spaced in time during movement of said reader;
    estimating a signal parameter of the backscatter signals of the plurality of backscatter signals to provide a plurality of derived signal parameters; and
    localizing the item in accordance with the plurality of derived signal parameters.

2. The localization method for use in a tag communication system of claim 1, wherein the backscatter signals are read by a tag reader having a single antenna further comprising localizing the item in accordance with an antenna array technique performed upon the plurality of derived signal parameters.

3. The localization method for use in a tag communication system of claim 1, further comprising:
    reading the backscatter signals with an antenna array to provide a further plurality of derived signal parameters for each tag reader location of the plurality of tag reader locations; and
    localizing the item in accordance with the further pluralities of derived signal parameters.

4. The localization method for use in a tag communication system of claim 1, further comprising calibrating the plurality of derived signal parameters in accordance with the further pluralities of derived signal parameters.

5. The localization method for use in a tag communication system of claim 1, further comprising:
    repeating said step of interrogating said tag by a reader which receives in turn a plurality of backscatter signals equally-spaced in time during movement of said reader, said repetition occurring at location different from said first interrogation.

6. The localization method for use in a tag communication system of claim 1, wherein the tag is a marker tag further comprising determining a tag reader location in accordance with the plurality of signal parameters.

7. The localization method for use in a tag communication system of claim 5, wherein said movement of said reader is a linear movement.

8. The localization method for use in a tag communication system of claim 5, wherein said reader is moved at a constant velocity.

* * * * *